Dec. 17, 1968 V. R. KAUFMAN 3,416,295
ROTARY LAWN MOWER WITH GASOLINE ENGINE
Filed Oct. 24, 1965
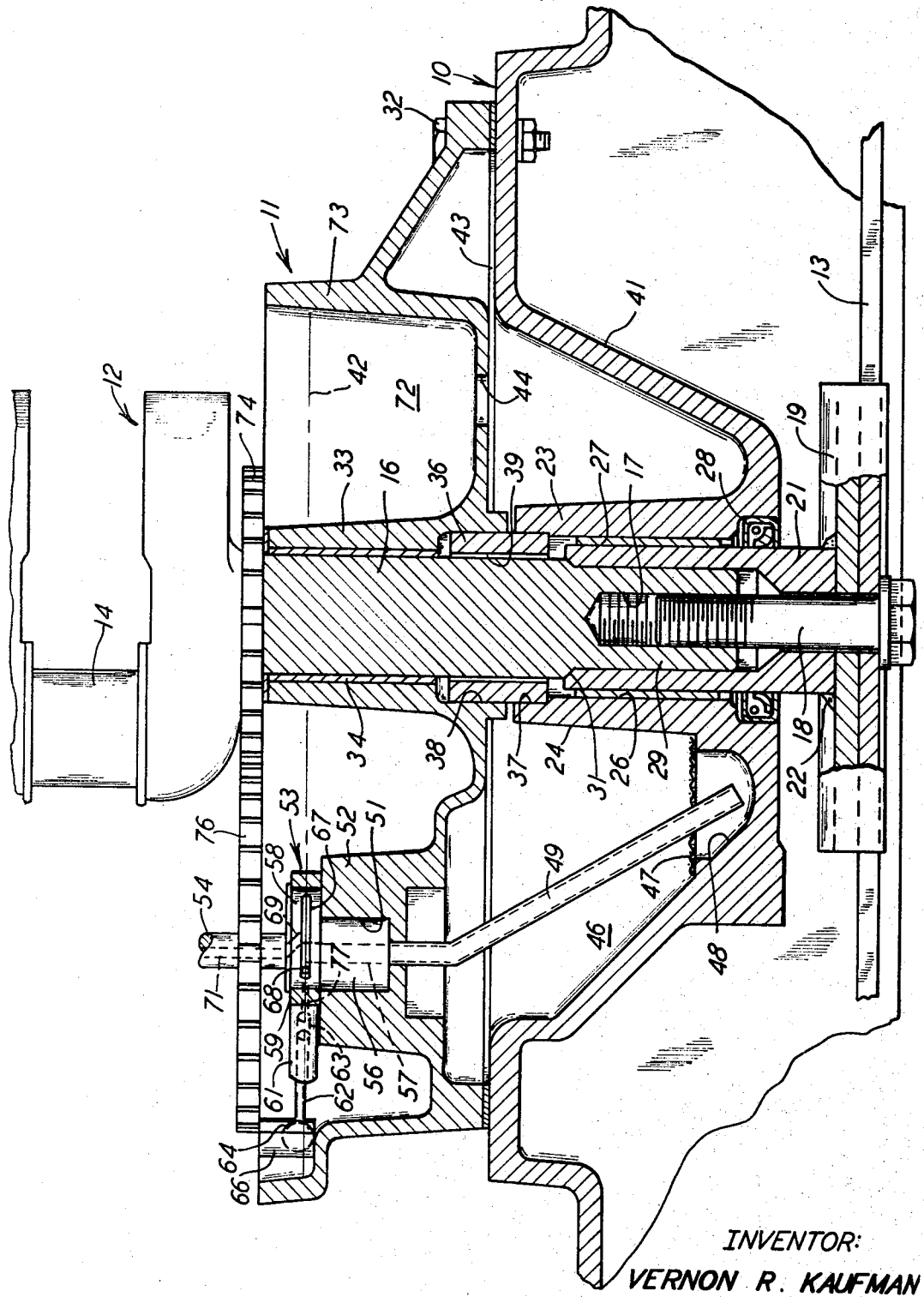
INVENTOR:
VERNON R. KAUFMAN
Arthur J. Hansmann
ATTORNEY

United States Patent Office 3,416,295
Patented Dec. 17, 1968

3,416,295
ROTARY LAWN MOWER WITH GASOLINE ENGINE
Vernon R. Kaufman, Racine, Wis., assignor to Jacobsen Manufacturing Company, Racine, Wis., a corporation of Wisconsin
Filed Oct. 24, 1965, Ser. No. 504,548
5 Claims. (Cl. 56—25.4)

ABSTRACT OF THE DISCLOSURE

A rotary lawn mower having an engine mounted on a mower housing, and having the engine crank shaft extending through an engine mounting base and through the mower housing. A crankshaft bearing is supported in each of the engine base and the mower housing, and an alignment dowel is disposed between the engine base and the mower housing for aligning the bearings. Also, the mower housing is recessed to form an oil sump with a low intake for constant oiling. The engine crankshaft carries a sleeve which in turn supports the cutter, and the sleeve and crankshaft have mating friction surfaces therebetween for transmitting rotation between the crankshaft and the sleeve.

---

This invention relates to a rotary lawn mower with a gasoline engine and, more particularly, it relates to the combination of mounting the engine and supporting its crankshaft with respect to the mower housing and to providing for the oil reservoir for the engine.

The lawn mower art is already well aware of the provision of mounting the gasoline engine on a mower and having the engine crankshaft vertically disposed so that the cutter is attached to the lower end of the crankshaft in its position for mowing. In mower design, there is concern with regard to protecting the crankshaft, including protecting it against excessive deflection, and protecting the engine itself against possible damage caused by the cutter striking a hard object, such as a stone or the like. Thus, mowers have been designed and constructed to take into account the danger of damaging the crankshaft and other parts of the engine, and the mower design has been made accordingly, in efforts to avoid this type of damage.

The present invention also relates to the mounting of the engine on a rotary type mower so that the crankshaft is protected against damage. In accomplishing this objective, the construction is arranged so that it can be readily and easily manufactured, and so that it can also be readily assembled and disassembled between the engine and mower parts for any replacement, maintenance, or the like. Thus it is a general object of this invention to provide an improved mounting for a gasoline engine on a rotary mower.

Still another object of this invention is to provide a combined rotary mower and gasoline engine which provides for the aforementioned consideration in the mounting of the engine, and which simultaneously provides for an improved lubrication means for the engine. In accomplishing these objects, the engine crank-shaft is mounted in a manner to be immediately and directly supported by the mower housing, and the mower housing itself also provides at least a portion of the oil system or sump for the lubrication of the engine parts, including the crankshaft.

Still another object of this invention is to provide an oil sump of a capacity increased from that normally provided by the mower engine alone. In addition to this object, it is a further object to have the oil sump or reservoir so arranged that the oil is fully available even though the mower is being operated along a hillside, that is, when the mower is tipped so that the oil would otherwise drain to a position where it is not accessible for recirculation. Also, the arrangement is such that the engine will be fully lubricated even though the oil level may be below a recommended level, that is, for instance, when the operator has neglected to main the oil level at a recommended height. Nevertheless, the lubrication system of this invention will provide the necessary oil for lubricating the engine if there is only a small quantity of oil in the entire system.

Other objects and advantages will become apparent upon reading the following description in light of the accompanying drawings, wherein:

The drawing shown is an elevational sectional view through a preferred embodiment of this invention and showing a central fragment of a rotary mower and an engine crankshaft mounted thereon.

The drawing shows the mower housing or deck, generally deisgnated 10, the engine mounting base, generally designated 11, and the engine crankshaft, generally designated 12. These three elements are assembled together as shown all for the purpose of supporting and operating a cutter 13 which revolves in the usual and well-known horizontal or ground-parallel plane for mowing grass or the like. The cutter 13, the mower housing 10, and the crankshaft 12 are shown. However, the complete construction will be readily understood by anyone skilled in the art, and the drawing is presented partly for simplicity and also in the largest size possible for clarity of showing.

The engine crankshaft 12 is a part of what may be a standard gasoline engine, and the engine therefore has an offset crank section 14, and it has its lower end 16 extending in a vertical direction and straight and terminating with a threaded opening 17 in its lower portion. The opening 17 receives a screw 18 which secures an adapter 19 to the crankshaft 16 through a sleeve 21 which is also welded to the adapter 19 by the weldment 22. The cutter bar 13 is secured to the adapter 19 and the sleeve 21 by means of the screw 18, as shown.

Thus it will be understood that rotation of the crankshaft will induce similar rotation to the sleeve 21, adapter 19, and finally to the cutter 13.

It will be further seen in the drawing that the mower housing or deck 10 has a central cylindrical boss 23 presenting an outer cylindrical wall 24 and an inner cylindrical wall 26. The inner wall 26 has a cylindrical bushing 27 disposed thereagainst for rotatably supporting the cylindrical sleeve 21. An oil seal 28 is also located between the mower housing boss 23 and the sleeve 21 for sealing therebetween.

The sleeve 21 is thus snug in its fit with the lowest end 29 of the crankshaft straight portion 16, and the sleeve and crankshaft have matching and abutting shoulders at the location designated 31. Thus the tightening of the screw 18 causes the respective shoulders to bear against each other and provide for a frictional drive between the crankshaft 12 and the sleeve 21. In this manner, there is a connection between the crankshaft end 16 and the sleeve 21 which is in the nature of a clutch in that it provides for relative rotation between the parts when the cutter 13 strikes a foreign object.

The housing or mower deck 10 also supports the gasoline engine and the engine mounting base 11, and the two may be connected together by bolts, such as the shown bolt 32 extending between the base 11 and the mower deck 10. The base 11 also has a central hub 33, and it too is cylindrically shaped and supports a cylindrical bushing 34 on the interior thereof. The bushing or bearing 34 provides for rotatable support of the crankshaft 16, as does the bushing or bearing 27 previously described. Thus the crankshaft end 16 is supported by the two spaced-apart bearings 27 and 34, and it will be further understood that a third crankshaft bearing would exist above the crank portion 14 and beyond the limit of the drawing shown, and this could be in the manner of that shown in my companion patent application filed on even date herewith and entitled, An Engine Mounting For a Rotary Lawn Mower.

An important feature of the engine mounting with respect to the mower deck 10 is the provision of a cylindrical alignment pin or dowel 36 which extends between the mower housing boss 23 and the engine base boss 33. The respective bosses have aligned and identically shaped circular openings 37 and 38, respectively so that the cylindrical dowel 36 is tightly fitted with respect to each boss 23 and 33. The dowel 36 is also shown to have a central cylindrical opening 39 for slight clearance with the crankshaft end 16. In this manner, that is by dowel 36, the engine the crankshaft 12 is aligned with the mower deck 10 and its opening and bearing, and the crankshaft is supported directly on the mower 10 to protect the engine and the crankshaft itself from damage due to impact of the cutter 13 against foreign objects. Thus the alignment between the engine and the mower is not of course dependent upon the mounting bolts 32 but is instead more accurately and positively retained by means of the single and central dowel 36.

The engine lubricating system is also arranged in combination with the aforementioned mounting and support of the crankshaft lower end 16. Thus the mower deck 10 has a depressed or dish-shaped central section 41 which is continuous in its extent around the central cylindrical boss 23 to provide an oil sump with the boss 23. That is, the mower wall portion 41 is liquid-tight to retain the oil directly in the mower deck itself. The dowel 36 is also sufficiently tight to preclude draining of the oil beyond the dowel and along the crankshaft end 16, even when the oil level is at the dot-dash line designated 42, and such line may be the normal oil level line. A gasket 43 is shown disposed between the mower housing 10 and the base 11 to seal at that point so that oil cannot escape, and, as indicated oil will also not escape either above or below or around the dowel 36 which is oil tight with respect to the bosses 23 and 33.

The base 11 has an oil drain opening 44 which permits the oil to flow from the engine and its base 11 and into the sump area designated 46 in the mower housing 10. Also, an oil screen 47 is shown in the base of the sump 46 to filter the oil draining through the screen 47 and into a lower sump or pocket 48 formed in the mower housing 10 as shown. A tube 49 extends between the pocket 48 and an opening 51 in a boss 52 on the engine base 11. The tube thus conducts the oil up to the engine by means of a pump generally designated 53 and located on top of the boss 52. Another tube 54 connects to the pump 53 and extends thereabove to conduct the oil up to the engine and particularly to the crankshaft 12, much in a conventional manner of both pump construction and conduction of the oil.

The pump 53 is of a conventional design and includes a lower shaft 56 which is rotatably mounted in the cylindrical opening 51 and has an oil passageway 57 in communication with the oil tube 49. An eccentric member 58 is integral with the shaft 56 to rotate therewith in a manner described hereinafter. A ring 59 is snug with the circular eccentric member 58 to be oscillated by the rotation of the eccentric member 58. The ring 59 has an arm 61 extending therefrom and the arm 61 slidably supports a rod 62 extending into an opening 63 in the arms 61. The rod 62 acts as a piston for sucking and pumping with respect to the oil. A ball 64 is on the end of the rod 62 and is retained in a socket 66 affixed to the engine base 11. It will thus be understood that upon rotation of the eccentric 58, the ring 59, and consequently the sleeve or member 61 are reciprocated to create a pumping action with respect to the rod 62 and thus direct the oil up to the outlet member 54. To complete this, the eccentric 58 has a groove 67 extending less than one-half the distance around, but on each side of, the eccentric member 58. An opening 68 communicates with the near groove 67 and with the respective passageway 57 and with a passageway 69 extending through the member 58 and into communication with the passageway 71 in the outlet member 54. The pump of course could be of other designs adequate for moving the oil up the tube 49 and the tube or shaft 54 for lubricating the engine crankshaft 12.

Thus the engine base 11 has its usual sump designated 72 and defined by the boss 33 and the outer wall 73 of the base 11. This base or engine sump 72 thus assists in retaining the oil at the normal level 42. Of course it will now be appreciated that in the event the oil drops below the level 42, and it may in fact drop down to the area of the pocket 48, nevertheless, the quantity of oil will still be adequate for being pumped through the pump 53 and up onto the engine crankshaft 12. The reason for this is that the sump 46 is provided and arranged so that the oil will normally drain into the small pocket 48, and there need not be much more oil than that which is sufficient to fill the pocket 48 in order for the entire system to operate as desired. Further, if the mower is operating on a hillside or any other incline, the oil would still be available in the pocket 48 since it would take extreme tipping of the mower to have the oil drain to a point where it would not be in the pocket 48 which is the only point where the oil need be for the entire system to be operative. Still further, it will now be appreciated that the oil capacity is substantially increased by the addition of the sump 46 provided by the mower deck 10.

It will be further noted in the drawing that a spur gear 74 is affixed to the shaft 12 to rotate therewith and drive a spur gear 76 which is affixed to the shaft 54 which in turn rotates the eccentric member 58 for operating the pump 53. Thus the pump 53 is shown in the suction position since the ring 59 is furthest from the piston 62. When the groove 67 communicates with an opening 77 which extends in the arm 61 and communicates between the eccentric 58 and the arm opening 63, oil is sucked through inlet 57, passageway 68, through passageway 77 and into opening 63. When the other groove 67 is rotated to meet passageway 77, the oil is pumped through passageways 69 and 71. It will also be noted that the housing sump 46 surrounds the boss 23 which is the bearing support for the lower end of the engine crankshaft, and this provides an oil circulation around the bearing support and some temperature balance so that there is both cooling of the bearing and greater surface for dissipating heat in the oil.

While a specific embodiment of this invention has been shown and described, it should be obvious that certain changes could be made in the embodiment and the invention should therefore be determined only by the scope of the appended claims.

What is claimed is:

1. In a rotary lawn mower, a mower housing, a gasoline engine including a vertically disposed engine crankshaft, a cutter carried by said crankshaft, the improvement comprising said mower housing having an upstanding bearing support portion and a vertically oriented opening extending through said bearing support portion, said housing further comprising wall structure spaced from and surrounding said bearing support portion and forming an oil sump between said bearing support structure and said wall structure, a bearing snugly disposed in said opening for radially guiding the lower end of said crank shaft and with said lower end being radially restricted by said bearing for transmitting impact forces on said cutter to said housing at said bearing support portion and thereby protect said crankshaft from bending damage, an oil pump included in said engine and being operative in response to rotation of said crankshaft, and an oil passage tube extending between said oil sump and said pump for conducting oil to said pump.

2. In a rotary lawn mower with a gasoline engine including a vertically disposed engine crankshaft, a mower housing having a vertically oriented central opening, a cutter carried by said crankshaft, the improvement comprising a bearing disposed in said opening for radially guiding the lower end of said crankshaft, an engine base interposed between said engine and said mower housing and being bolted thereto and having an opening extending therethrough and receiving said lower end of said crankshaft, and an alignment dowel extending in contact with said engine base and said mower housing in tight fit in both said openings of said engine base and said mower housing and with said dowel encircling said crankshaft lower end and disposed to align said bearing and said crankshaft.

3. In a rotary lawn mower with a gasoline engine including a vertically disposed engine crankshaft, a mower housing having a vertically oriented central opening, a sleeve removably connected to the lower end of said crankshaft, a cutter connected to said sleeve to be carried by said crankshaft, the improvement comprising a bearing supported by said housing and snugly disposed in said opening and being disposed adjacent said sleeve for radially guiding said sleeve, an engine base interposed between said engine and said mower housing and being bolted thereto, and an alignment member extending between and in contact with both said engine base and said mower housing and disposed to align said sleeve and said crankshaft, said sleeve and said crankshaft having friction clutch surfaces mating therebetween for transmitting rotation of said crankshaft to said sleeve only when the transmitting force is less than the frictional force applied between said crankshaft and said sleeve.

4. In a rotary lawn mower with a gasoline engine including a vertically disposed engine crankshaft, a mower housing having an oil-tight oil sump, a cutter carried by said crankshaft, a bearing on said housing for radially guiding the lower end of said crankshaft and for transmitting impact forces from said cutter to said housing, the improvement comprising said housing having a central boss defining a vertically oriented opening extending through said housing, said housing being recessed raound said boss for forming said oil sump, said bearing being snugly disposed in said housing opening, a cylindrical alignment dowel fluid-tightly extending into said housing opening and being rigid with said engine and being oil-tight with said housing for fluid sealing around said opening and being disposed to align said crankshaft and said bearing, an oil pump included in said engine and being operative in response to rotation of said crankshaft, and an oil passafe tube extending between said sump and said pump for conducting oil to said pump.

5. A rotary lawn mower with a gasoline engine including a vertically disposed engine crankshaft, comprising a mower housing having a vertically oriented central opening, a cutter carried by said crankshaft, a bearing disposed is said housing opening for radially guiding the lower end of said crankshaft for transmitting impact forces from said cutter to said housing at said housing opening and thereby protect said crankshaft from excessive bending damage, an engine base disposed between said engine and said mower housing and being bolted to the latter and having an opening therein, a bearing in said engine base opening and rotatably supporting said crankshaft, and an alignment dowel extending in snug fit with said housing and said engine base in their respective said openings and aligning said bearings and said crankshaft.

References Cited
UNITED STATES PATENTS 2,896,603    7/1959    Buske et al.
3,114,229    12/1963    Wilson _____ 56—25.4
3,304,714    2/1967    Becher.

ROBERT E. BAGWILL, *Primary Examiner.*

U.S. Cl. X.R.

123—196; 184—6